United States Patent
Li et al.

(10) Patent No.: US 10,546,174 B2
(45) Date of Patent: Jan. 28, 2020

(54) FINGERPRINT IDENTIFYING MODULE, FABRICATION METHOD AND DRIVING METHOD FOR THE SAME, AND DISPLAY DEVICE

(71) Applicant: BOE TECHNOLOGY GROUP CO., LTD., Beijing (CN)

(72) Inventors: Changfeng Li, Beijing (CN); Haisheng Wang, Beijing (CN); Yingming Liu, Beijing (CN); Xiaoliang Ding, Beijing (CN); Rui Xu, Beijing (CN); Yanan Jia, Beijing (CN); Lijun Zhao, Beijing (CN); Yuzhen Guo, Beijing (CN); Pengpeng Wang, Beijing (CN); Wei Liu, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 134 days.

(21) Appl. No.: 15/569,279

(22) PCT Filed: May 23, 2017

(86) PCT No.: PCT/CN2017/085532
§ 371 (c)(1),
(2) Date: Oct. 25, 2017

(87) PCT Pub. No.: WO2018/001002
PCT Pub. Date: Jan. 4, 2018

(65) Prior Publication Data
US 2018/0225497 A1    Aug. 9, 2018

(30) Foreign Application Priority Data

Jun. 30, 2016   (CN) .......................... 2016 1 0514151

(51) Int. Cl.
G06K 9/00    (2006.01)

(52) U.S. Cl.
CPC ......... G06K 9/0004 (2013.01); G06K 9/0008 (2013.01)

(58) Field of Classification Search
CPC ............................ G06K 9/004; G06K 9/0008
See application file for complete search history.

(56) References Cited

U.S. PATENT DOCUMENTS 6,154,580 A * 11/2000 Kuriyama ............ G06K 9/0002
                                                              250/556
9,501,631 B2 * 11/2016 Frye ........................ G06F 21/32
(Continued)

FOREIGN PATENT DOCUMENTS

CN    103530609 A    1/2014
CN    104155785 A    11/2014
(Continued)

OTHER PUBLICATIONS

Chinese Office Action in Chinese Application No. 201610514151.8, dated Sep. 26, 2018 with English translation.
(Continued)

*Primary Examiner* — Aaron W Carter
(74) *Attorney, Agent, or Firm* — Collard & Roe, P.C.

(57) ABSTRACT

A fingerprint identifying module, a fabrication method and a driving method for the same, and a display device are provided. The fingerprint identifying module includes a substrate, and a plurality of array-arranged fingerprint identifying modules provided on the substrate. Each of the fingerprint identifying modules includes a lower electrode, an upper electrode, and a photocurrent generating unit connected between the upper electrode and the lower electrode. The photocurrent generating unit includes a PN junction, one end of the PN junction being connected with the upper electrode, and the other end of the PN junction being connected with the lower electrode.

15 Claims, 7 Drawing Sheets

(56) References Cited

U.S. PATENT DOCUMENTS

| | | | |
|---|---|---|---|
| 9,514,350 B2 | 12/2016 | Wang et al. | |
| 9,997,574 B2* | 6/2018 | Yang | G06K 9/0004 |
| 2002/0018252 A1* | 2/2002 | Lee | G06K 9/00013 |
| | | | 358/483 |
| 2002/0076089 A1* | 6/2002 | Muramatsu | G06K 9/0012 |
| | | | 382/124 |
| 2003/0136762 A1* | 7/2003 | Zhao | H01L 22/34 |
| | | | 216/59 |
| 2007/0257256 A1* | 11/2007 | Kugler | B82Y 10/00 |
| | | | 257/40 |
| 2009/0303371 A1* | 12/2009 | Watanabe | H01L 27/14603 |
| | | | 348/311 |
| 2010/0117126 A1* | 5/2010 | Takahashi | H01L 27/14609 |
| | | | 257/292 |
| 2015/0069471 A1* | 3/2015 | Kawamura | H01L 27/14818 |
| | | | 257/228 |
| 2016/0020237 A1* | 1/2016 | Yamakawa | H04N 5/374 |
| | | | 257/233 |
| 2016/0042216 A1 | 2/2016 | Yang et al. | |
| 2016/0180139 A1* | 6/2016 | Hung | A61B 5/1172 |
| | | | 382/124 |
| 2017/0032167 A1 | 2/2017 | Chen et al. | |
| 2017/0221972 A1* | 8/2017 | Yang | G06K 9/0004 |
| 2017/0255810 A1 | 9/2017 | Liu et al. | |
| 2017/0279948 A1* | 9/2017 | Hong | G06K 9/00013 |
| 2017/0294467 A1* | 10/2017 | Tamiya | H01L 25/065 |
| 2017/0316244 A1* | 11/2017 | Yang | G06K 9/00013 |
| 2017/0337418 A1 | 11/2017 | Wang et al. | |
| 2017/0359018 A1* | 12/2017 | Rhee | H01L 27/301 |
| 2018/0150668 A1* | 5/2018 | Li | H01L 27/12 |
| 2018/0225497 A1* | 8/2018 | Li | G06K 9/00 |
| 2019/0057236 A1* | 2/2019 | Liu | G06K 9/0002 |
| 2019/0080136 A1* | 3/2019 | Wu | G06K 9/0004 |

FOREIGN PATENT DOCUMENTS

| | | |
|---|---|---|
| CN | 204808361 U | 11/2015 |
| CN | 105184247 A | 12/2015 |
| CN | 105243361 A | 1/2016 |
| CN | 204946029 U | 1/2016 |
| CN | 105373772 A | 3/2016 |
| CN | 105550662 A | 5/2016 |
| CN | 105956584 A | 9/2016 |

OTHER PUBLICATIONS

International Search Report of PCT/CN2017/085532 in Chinese, dated Aug. 24, 2017 with English translation.

Notice of Transmittal of the International Search Report of PCT/CN2017/085532 in Chinese, dated Aug. 24, 2017.

Written Opinion of the International Searching Authority of PCT/CN2017/085532 in Chinese, dated Aug. 24, 2017 with English translation.

Chinese Office Action in Chinese Application No. 201610514151.8, dated Jul. 2, 2019 with English translation.

\* cited by examiner

FINGERPRINT IDENTIFYING MODULE, FABRICATION METHOD AND DRIVING METHOD FOR THE SAME, AND DISPLAY DEVICE

CROSS REFERENCE TO RELATED APPLICATIONS

This application is the National Stage of PCT/CN2017/085532 filed on May 23, 2017, which claims priority under 35 U.S.C. § 119 of Chinese Application No. 201610514151.8 filed on Jun. 30, 2016, the disclosure of which is incorporated by reference.

TECHNICAL FIELD

Embodiments of the present disclosure relate to a field of a display, and more particularly, to a fingerprint identifying module, a fabrication method and a driving method for the same, and a display device.

BACKGROUND

An organic light-emitting diode (OLED) display has begun to gradually replace a liquid crystal display (LCD), due to characteristics such as high contrast, small thickness, wide viewing angle, fast response speed, and so on. A traditional LCD may integrate a fingerprint identifying function into the LCD, so as to implement display and the fingerprint identifying function simultaneously; however, with respect to the OLED display, there is no OLED display integrated with the fingerprint identifying function.

SUMMARY

In order to solve at least the problem that there is no OLED display integrated with a fingerprint identifying function, embodiments of the present disclosure provide a fingerprint identifying module and a fabrication method thereof, a driving method, and a display device.

In first aspect, an embodiment of the present disclosure provides a fingerprint identifying module, the fingerprint identifying module comprising a substrate, and a plurality of fingerprint identifying modules on the substrate and arranged as an array; wherein each of the fingerprint identifying modules comprises: a lower electrode, an upper electrode, and a photocurrent generating unit between the upper electrode and the lower electrode and connected with both the upper electrode and the lower electrode, the photocurrent generating unit comprises a PN junction, one end of the PN junction being connected with the upper electrode, and other end of the PN junction being connected with the lower electrode.

In second aspect, an embodiment of the present disclosure provides a display device, comprising a display panel and the above-stated fingerprint identifying module which is provided on the display panel.

In third aspect, an embodiment of the present disclosure provides a method of fabricating a fingerprint identifying module, the method comprises: providing a substrate; forming a lower electrode on the substrate; forming a photocurrent generating unit on the lower electrode; forming an upper electrode on the photocurrent generating unit, the photocurrent generating unit comprising a PN junction, one end of the PN junction being connected with the upper electrode, and the other end of the PN junction being connected with the lower electrode.

In fourth aspect, an embodiment of the present disclosure provides a method of driving the above-stated fingerprint identifying module, the method comprises: inputting a first fingerprint identifying voltage to the lower electrode in a mode of row-by-row scanning at fingerprint identifying stage; inputting a second fingerprint identifying voltage to the upper electrode in a currently scanned row, and acquiring a feedback voltage formed by combining a photocurrent generated in the photocurrent generating unit with the second fingerprint identifying voltage; determining whether the lower electrode corresponds to a valley or a ridge of a fingerprint according to the feedback voltage.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
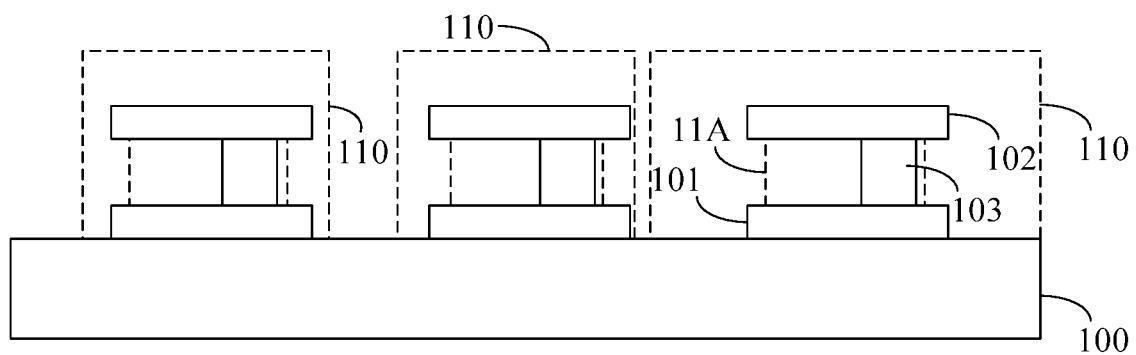
FIG. 1 is a schematic diagram of a fingerprint identifying module provided by an embodiment of the present disclosure.

FIG. 1 is a schematic diagram of a fingerprint identifying module provided by an embodiment of the present disclosure. The fingerprint identifying module (hereinafter referred to as "module") is applicable to an organic light-emitting diode (OLED) display panel, a liquid crystal display panel, and the like. With reference to FIG. 1, the module comprises a substrate 100, a plurality of fingerprint identifying modules 110 provided on the substrate 100 and arranged as an array. Each fingerprint identifying module 110 comprises a lower electrode 101, an upper electrode 102, and a photocurrent generating unit 11A connected to the upper electrode 101 and the lower electrode 102 and disposed between the upper electrode 101 and the lower electrode 102. The photocurrent generating unit 11A comprises a PN junction 103, one end of the PN junction 103 being connected with the upper electrode 101, and the other end of the PN junction 103 being connected with the lower electrode 102.

The lower electrode 101 and the upper electrode 102 are respectively configured for providing a first fingerprint identifying voltage and a second fingerprint identifying voltage for the photocurrent generating unit 11A, and the photocurrent generating unit 11A is capable of generating a photocurrent when the unit is irradiated by the light and the photocurrent will effect on the second fingerprint identifying voltage to form a feedback voltage.

In embodiment of the present disclosure, the first fingerprint identifying voltage and the second fingerprint identifying voltage are respectively provided for the photocurrent generating unit by the lower electrode and the upper electrode. When a user's finger touches the module, the light reflected by the user's finger irradiates the PN junction of the photocurrent generating unit; the PN junction generates a photocurrent under the light irradiation and the photocurrent effects on the second fingerprint identifying voltage. Because the intensities of lights respectively reflected by a valley and a ridge of a fingerprint of the finger onto the photocurrent generating unit are different from each other, the photocurrents generated in the photocurrent generating unit are also different from each other, so that amounts of change in voltages on the upper electrode (or the lower electrode) are different, in this way, the valley and the ridge of the fingerprint can be identified. By this means, the module having a fingerprint identifying function is accomplished. In an example, the fingerprint identifying module is applied to the OLED display panel, so the OLED display panel having the fingerprint identifying function is accomplished.

Figure 2A:
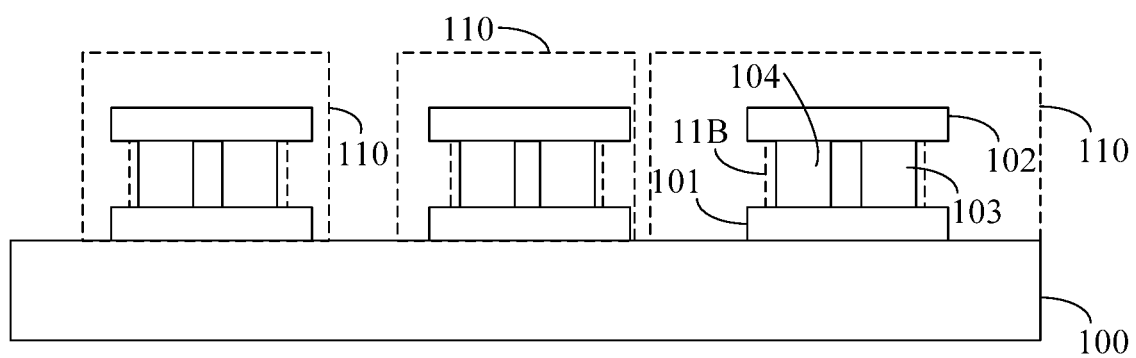
FIG. 2a is a schematic diagram of another fingerprint identifying module provided by an embodiment of the present disclosure.
Figure 2B:
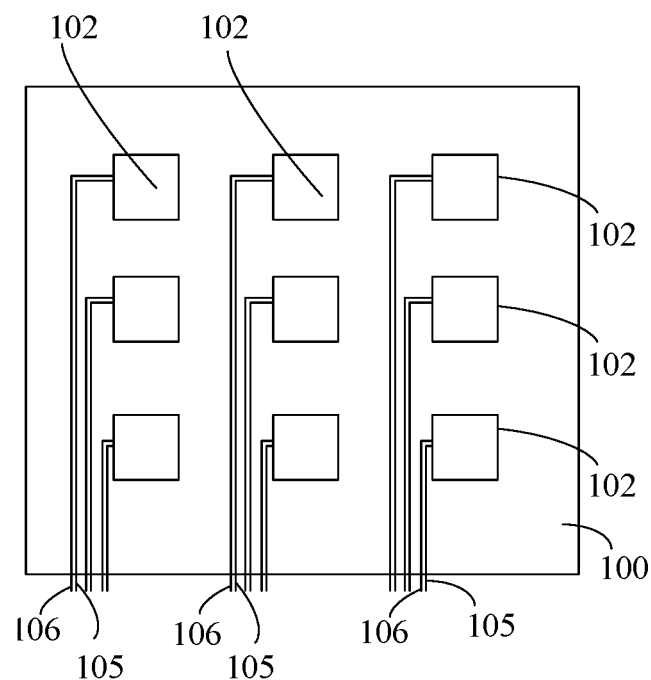
FIG. 2b is a top view of the fingerprint identifying module provided by the embodiment of the present disclosure.
Figure 2C:
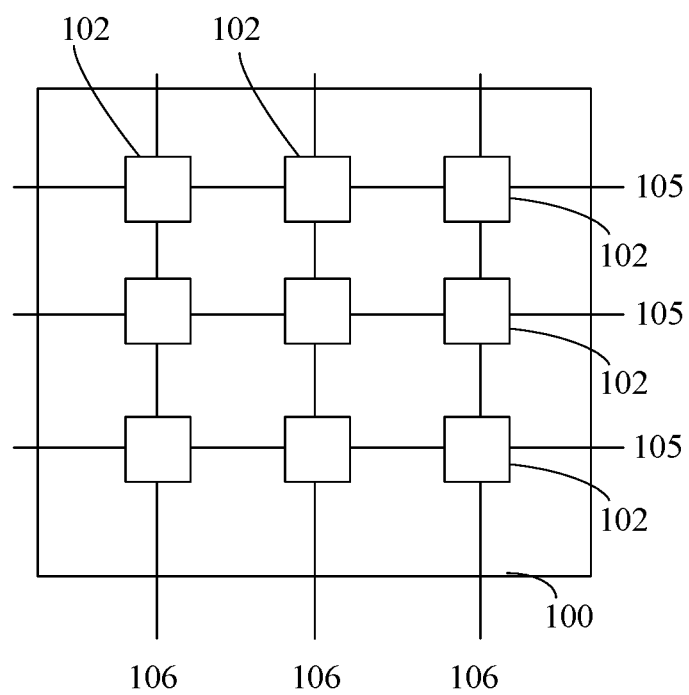
FIG. 2c is a top view of the fingerprint identifying module provided by the embodiment of the present disclosure.

FIG. 2a is a schematic diagram of another module provided by an embodiment of the present disclosure. The module is applicable to an OLED display panel, a liquid crystal display panel, and the like. With reference to FIG. 2a, the module comprises a substrate 100, a plurality of fingerprint identifying modules 110 provided on the substrate 100 and arranged as an array. Each fingerprint identifying module 110 comprises a lower electrode 101, an upper electrode 102, and a photocurrent generating unit 11B connected to and disposed between the upper electrode 101 and the lower electrode 102. The photocurrent generating unit 11B comprises a thin film transistor (TFT) 104 and a PN junction 103 provided between the upper electrode 102 and the lower electrode 101. FIG. 2b and FIG. 2c are top views of the module provided in FIG. 2a. With reference to FIG. 2b, the above-described photocurrent generating unit 11B further comprises a scanning line 105 and a sensing line 106.

In at least some of embodiments, the upper electrode 102 is connected with both a drain electrode of the TFT 104 and one end of the PN junction 103, the other end of the PN junction 103 is connected with the lower electrode 101. The lower electrode 101 is connected with the scanning line 105; the scanning line 105 is configured for inputting a first fingerprint identifying voltage to the lower electrode 101 when the TFT 104 is turned on. The TFT 104 is configured for being turned on under the effect of a gate voltage. A source electrode of the TFT 104 is connected with the sensing line 106, and the sensing line 106 is configured for inputting a second fingerprint identifying voltage to the source electrode of the TFT 104.

Since FIG. 2b and FIG. 2c are top views, the lower electrode 101 connected with the scanning line 105 and the source electrode of the TFT 104 connected with the sensing line 106 are not illustrated, but it should be noted that both the scanning line 105 and the sensing line 106 in FIG. 2b are not connected with the upper electrode 102.

With the above-described structure, it is possible to input, at fingerprint identifying stage, the first fingerprint identifying voltage to the lower electrodes 101 in a row-by-row scanning mode, and input the second fingerprint identifying voltage to the upper electrodes 102 in currently scanned row.

In the module provided by FIG. 2b, each fingerprint identifying module 110 is connected with both one of scanning lines 105 and one of sensing lines 106. In the module provided by FIG. 2c, each row of fingerprint identifying modules 110 share one scanning line 105, and each column of fingerprint identifying modules 110 share one sensing line 106. In the above-described embodiment, once the first fingerprint identifying voltage is inputted to the scanning line 105 which is connected with a row of lower electrodes 101, the TFT 104 which is connected with the same row of corresponding upper electrodes 102 is turned on, so that the corresponding upper electrodes 102 can receive the second fingerprint identifying voltage provided by the sensing line 106.

In the module provided by FIG. 2b, because each fingerprint identifying module 110 is connected with both one of scanning lines 105 and one of sensing lines 106, the row-by-row scanning of fingerprint identification can be implemented by directly controlling signal timings of each of the scanning lines 105 and of each of the sensing lines 106. Thus, in at least some of embodiments, it is not necessary to provide any TFT 104 between the sensing line 106 and the upper electrode 102, i.e., the photocurrent generating unit only comprises the PN junction 103, the scanning line 105 and the sensing line 106. For example, the sensing line 106 and the upper electrode are directly connected with each other.

The first fingerprint identifying voltage and the second fingerprint identifying voltage are configured for providing an additional electric field for the PN junction. The direction of the additional electric field is same as a direction of an internal electric field of the PN junction, which can strengthen the internal electric field, so that the diffusions of the majority carriers will be decreased, and the shifts of the minority carriers merely forms a reverse current. In the absence of light, the reverse current is extremely weak, which is referred to as a dark current; and in the presence of light, the reverse current is quickly increased to tens of microamperes (μA), which is referred to as the photocurrent. The greater the intensity of light is, the greater the photocurrent is.

Figure 3:
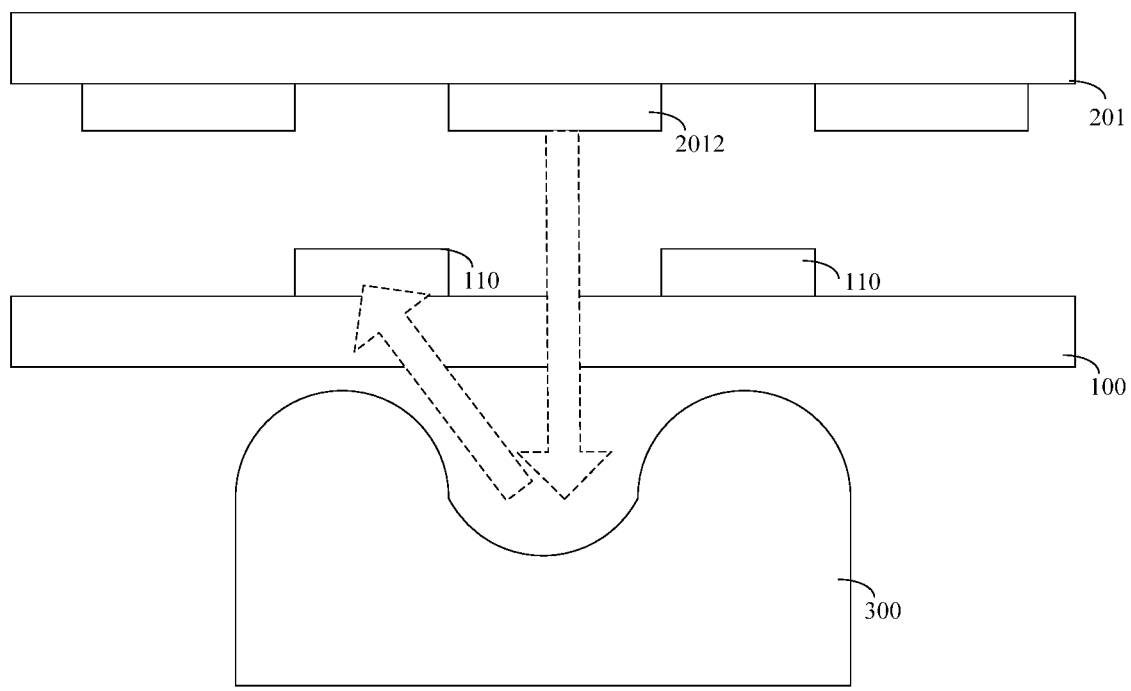
FIG. 3 is an operational schematic diagram of a fingerprint identifying module provided by an embodiment of the present disclosure.

FIG. 3 is an operational schematic diagram of the module provided by FIG. 2a to FIG. 2c, and it is illustrated with an example where the fingerprint identifying module is applied to an OLED display panel. With reference to FIG. 3, when a finger 300 of the user touches the module, light emitted from a sub-pixel region 2012 of an OLED display panel 201 is irradiated onto the user's finger 300, and light reflected by the user's finger passes through the substrate 100 and irradiate the PN junction of the fingerprint identifying module 110. Because intensities of lights reflected by the valley and the ridge of the fingerprint of the finger to the PN junction are different from each other, the photocurrents generated in the PN junction are different from each other, so that amounts of change in the second fingerprint identifying voltage on the sensing line are different. In this way, the valley and the ridge of the fingerprint can be identified, and the fingerprint identification can be implemented by identifying valley and the ridge through the plurality of fingerprint identifying modules 110.

In the fingerprint identifying module, while the TFT is turned on, the source electrode and the drain electrode are turned on. Because the drain electrode is connected with one end of the PN junction through the upper electrode, the potential of one end of the PN junction is the second fingerprint identifying voltage. When the TFT is turned on, the scanning line inputs the first fingerprint identifying voltage to the lower electrode, and because the lower electrode is connected with the other end of the PN junction, the potential of the other end of the PN junction is the first fingerprint identifying voltage. When the user's finger touches the module, light reflected by the user's finger irradiates the PN junction, and the PN junction generates the photocurrent under light irradiation which effects on the second fingerprint identifying voltage. Because the intensities of light reflected from the valley and the ridge of the fingerprint of the finger to the PN junction are different from each other, the photocurrents generated in the PN junction are different from each other, so that amounts of change in the second fingerprint identifying voltage on the sensing line are different. In this way, the valley and the ridge of the fingerprint can be identified, and the module having the fingerprint identifying function is accomplished. In an example, the module is applied to the OLED display panel, the OLED display panel having the fingerprint identifying function can be accomplished.

The substrate 100 is also referred to as a base substrate, and in at least some of embodiments, the base substrate is transparent, for example, a glass substrate, a plastic substrate, or a silicon substrate, and the like.

In at least some of embodiments, the lower electrode 101 is made of a transparent conductive material. The lower electrode 101 made of the transparent conductive material may be used as an electrode for fingerprint identifying because it is light-transmissive.

For example, the transparent conductive material comprises, but not limited to, indium tin oxide (ITO) or indium zinc oxide (IZO).

In at least some of embodiments, the scanning line 105 is configured for inputting the first fingerprint identifying voltage to the lower electrode 101 at fingerprint identifying stage, and inputting a touch signal to the lower electrode 101 at touch sensing stage. For example, the scanning line 105 is configured for inputting the touch signal to the lower electrode 101 when the TFT 104 is turned off. When the TFT 104 is turned off, the lower electrode 101 implements a touching function by self-capacitance under an effect of the touch signal. That is, the touching and fingerprint identification functions can be achieved in a time divisional mode.

In at least some of embodiments, in order to facilitate fingerprint identifying and touch positioning, the lower electrode 101 is designed as a rectangular block electrode. Of course, rectangle is exemplary and merely intended to facilitate arrangement and fabrication of the lower electrode 101, other shapes of the lower electrode 101 may also be used, for example, circle, trapezoid, and the like. Here, the shape is depicted as a shape of the lower electrode parallel to the plane of the substrate.

For example, the block electrodes are distributed in a matrix. When the fingerprint identification is performed, the first fingerprint identifying voltage is input into the lower electrodes in a row-by-row scanning mode. At the time of inputting the first fingerprint identifying voltage into the lower electrodes, the corresponding TFTs are turned on, so that the upper electrodes receive the second fingerprint identifying voltage, in this way, the fingerprint identification in the same row can be implemented.

For example, the block electrode is a square electrode having a side length of 3 mm to 8 mm. In an example, the side length is approximately 5 mm. The block electrode with the above size and shape can meet an accuracy requirement of touch and make its driving circuit simpler.

Accordingly, the upper electrode 102 may also be designed as a block electrode. For example, as illustrated in FIG. 2b and FIG. 2c, the upper electrode 102 is a rectangular block electrode. Of course, rectangle is exemplary and merely intended to facilitate arrangement and fabrication of the upper electrode 102, other shapes of the upper electrode 102 may also be used, for example, circle, trapezoid, and the like. Here, the shape is depicted as a shape of the upper electrode parallel to the plane of the substrate.

In at least some of embodiments, the upper electrode 102 and the lower electrode 101 have overlapping region in a vertical direction perpendicular to the substrate. For example, the two partially overlap or completely overlap.

In at least some of embodiments, the upper electrode 102 is made of metal, for example, aluminum (Al), copper (Cu), molybdenum (Mo), titanium (Ti), (chromium) Cr and the like.

Figure 4:
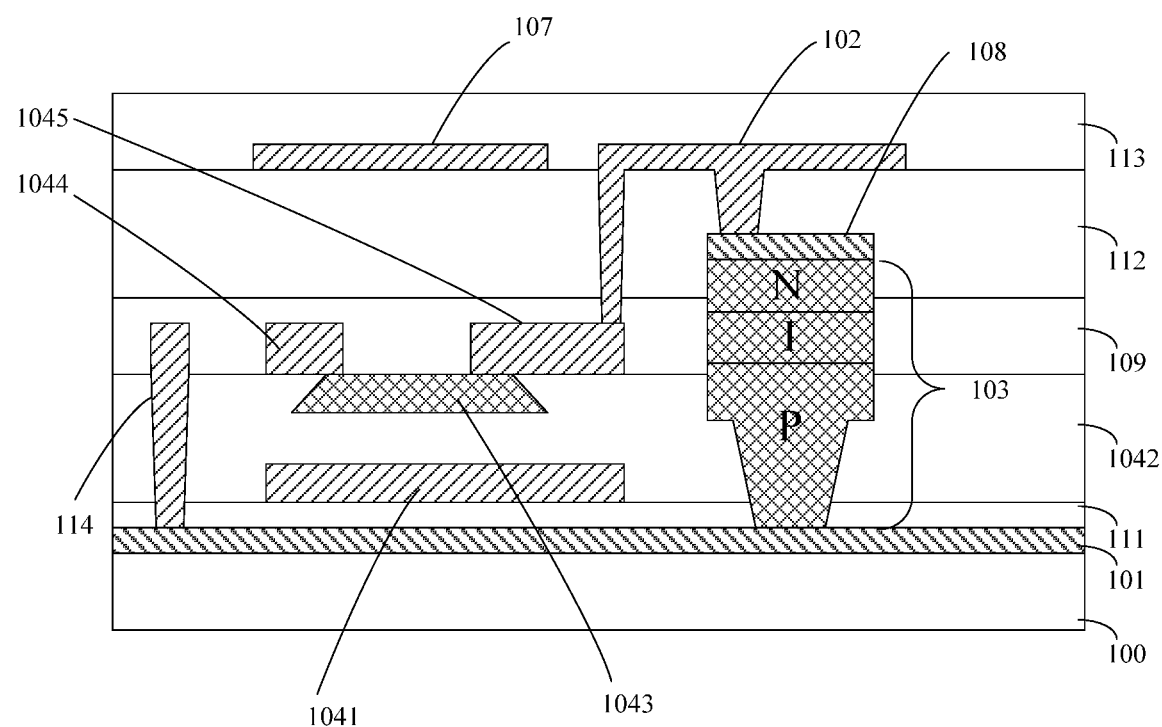
FIG. 4 is a schematic diagram of still another fingerprint identifying module provided by an embodiment of the present disclosure.

FIG. 4 is a schematic diagram of another module provided by an embodiment of the present disclosure. For example, FIG. 4 is a longitudinal sectional view of the fingerprint identifying module illustrated in FIG. 3. With reference to FIG. 4, in the module, a light-shielding layer 107 is provided above the TFT 104, in order to prevent a channel region of the TFT 104 from being irradiated by the light emitted from a light source of a display device, which may impact the characteristic of the TFT.

In embodiments of the present disclosure, the light-shielding layer 107 and the upper electrode 102 are provided on a same layer, for example, the light-shielding layer 107 is a metallic light-shielding layer 107. The light-shielding layer 107 is on the same layer as the upper electrode 102, and is easily fabricated.

In embodiments of the present disclosure, as illustrated in FIG. 4, the PN junction 103 comprises a P-doped amorphous silicon (a-Si) layer (Region P), an undoped a-Si layer (an intrinsic region, i.e., Region I) and an N-doped a-Si layer (Region N) sequentially arranged on the lower electrode 101.

For example, a direction of an internal electric field of the PN junction 103 is directed from Region N to Region P, and a voltage (a first fingerprint identifying voltage being smaller than a second fingerprint identifying voltage) is applied to the PN junction, so that a direction of an additional electric field coincides with that of the internal electric field, and at this time, the drift of only the minority carriers forms a reverse current. In the absence of light, the reverse current is extremely weak, which is referred to as a dark current; and in the presence of light, the reverse current is quickly increased to tens of microamperes, which is referred to as the photocurrent. The greater the intensity of light is, the greater the photocurrent is.

In embodiments of the present disclosure, a conductive thin film 108 is provided on an end surface of one end of the PN junction 103 connected with the upper electrode 102. The conductive thin film 108 guides the photocurrent to smoothly enter the upper electrode 102.

For example, the conductive thin film 108 is an ITO or IZO thin film.

In embodiments of the present disclosure, the TFT 104 comprises a gate electrode 1041, a gate insulating layer 1042, an indium gallium zinc oxide (IGZO) active layer 1043, as well as a source electrode 1044 and a drain electrode 1045, which are arranged sequentially.

In at least some of embodiments, the gate electrode 1041, the source electrode 1044 and the drain electrode 1045 of the TFT 104 are made of metal, such as Al, Cu, Mo, Ti, Cr, or the like. The gate insulating layer 1042 may be made of silicon nitride or silicon oxynitride.

In embodiments of the present disclosure, the module further comprises a dielectric layer 109. The TFT 104 and the PN junction 103 are isolated from each other by the dielectric layer 109, so as to ensure that the TFT 104 and the PN junction 103 are insulated from each other, to avoid a short circuit.

Further, the module further comprises a first insulating layer 111, a second insulating layer 112 and a third insulating layer 113. The first insulating layer 111 is provided between the lower electrode 101 and the TFT 104, and the gate electrode 1041 of the TFT 104 is provided on the first insulating layer 111. The second insulating layer 112 is provided on the TFT 104 and the PN junction 103. The third insulating layer 113 is provided on the upper electrode 102 and the light-shielding layer 107.

In at least some of embodiments, the dielectric layer 109, the first insulating layer 111 and the third insulating layer 113 are made of silicon nitride or silicon oxynitride.

In at least some of embodiments, the second insulating layer 112 are made of resin material.

In embodiments of the present disclosure, both the scanning line 105 and the sensing line 106 are arranged in a same layer as the source electrode 1044 of the TFT 104. The scanning line 105 and the sensing line 106 are arranged in a same layer as the source electrode 1044 (or the drain electrode 1045), so as to simplify a fabrication process.

The scanning line 105 and the sensing line 106 may also be arranged in other modes, for example, the scanning line 105 and the gate electrode 1041 are provided in a same layer, and the sensing line 106 and the source electrode 1044 are provided in a same layer.

As illustrated in FIG. 4, the lower electrode 101 is connected with the scanning line 105 through a contact hole 114.

Figure 5:
FIG. 5 is a schematic diagram of a display device provided by an embodiment of the present disclosure.

FIG. 5 is a schematic diagram of a display device provided by an embodiment of the present disclosure, the display device comprises an OLED substrate 201 and a fingerprint identifying module 202 provided on the OLED substrate 201, the fingerprint identifying module is provided by any one of the foregoing embodiments, for example, the fingerprint identifying module is one of FIG. 1 to FIG. 4.

The OLED display panel provided by embodiments of the present disclosure may be a mobile phone, a tablet personal computer, a television, a monitor, a laptop computer, a digital photo frame, a navigator, or any product or part with a display function.

In embodiments of the present disclosure, while the TFT is turned on, the source electrode and the drain electrode are turned on. Because the drain electrode is connected with one end of the PN junction through the upper electrode, the potential of one end of the PN junction is the second fingerprint identifying voltage. When the TFT is turned on, the scanning line inputs the first fingerprint identifying voltage to the lower electrode, and because the lower electrode is connected with the other end of the PN junction, the potential of the other end of the PN junction is the first fingerprint identifying voltage. When the user's finger touches the module, light reflected by the user's finger irradiates the PN junction, the PN junction generates the photocurrent under light irradiation which effects on the second fingerprint identifying voltage. Because intensities of light reflected from the valley and the ridge of the fingerprint of the finger to the PN junction are different from each other, the photocurrents generated in the PN junction are different from each other, so that amounts of change in the second fingerprint identifying voltage on the sensing line are different. In this way, the valley and the ridge of the fingerprint can be identified, and the module having the fingerprint identifying function is accomplished. In an example, the module is applied to the OLED display panel, the OLED display panel having the fingerprint identifying function can be accomplished.

In embodiments of the present disclosure, the OLED substrate 201 comprises a plurality of sub-pixel regions, and a projection of the upper electrode 102 in the plane of OLED substrate 100 is located between adjacent sub-pixel regions. The upper electrode 102 is provided between adjacent sub-pixel regions, in order to avoid shielding light emitted by an OLED sub-pixel.

Figure 6:
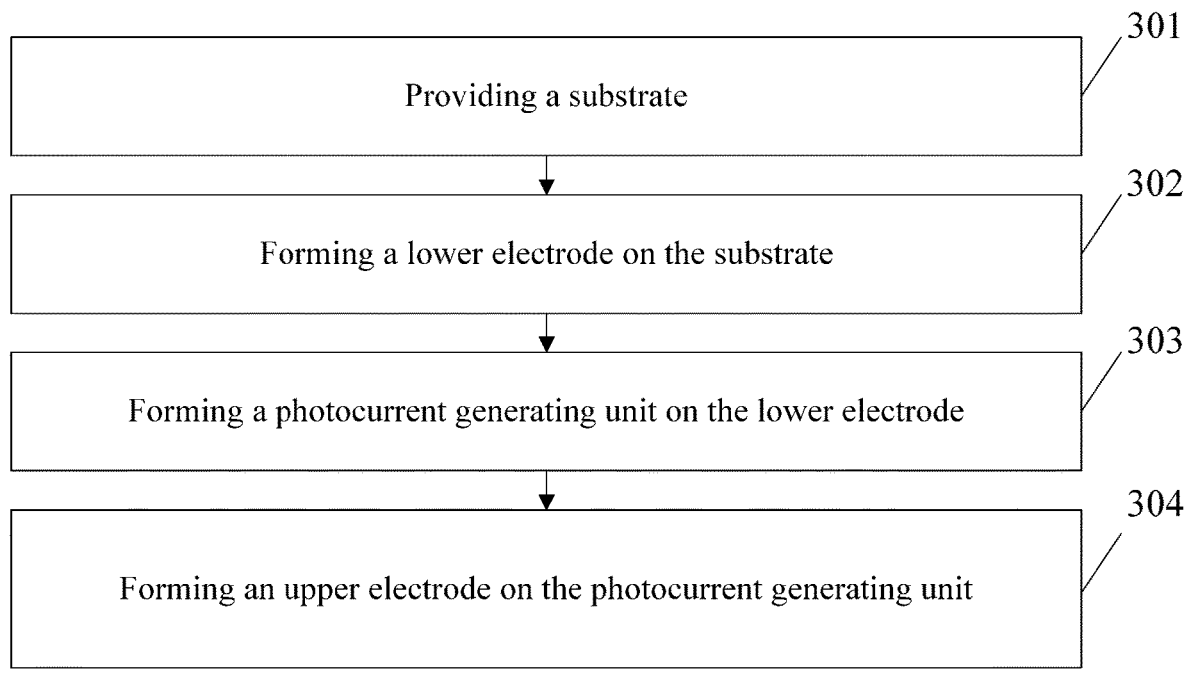
FIG. 6 is a flow chart of a fabrication method of a fingerprint identifying module provided by an embodiment of the present disclosure.

FIG. 6 is a flow chart of a fabrication method of a fingerprint identifying module provided by an embodiment of the present disclosure, for example, the method is used for fabricating the fingerprint identifying module illustrated in FIG. 1. With reference to FIG. 6, the method comprises:

Step 301: providing a substrate.

As described above, the substrate is also referred to as a base substrate, and is made of transparent material, which may be a glass substrate, a plastic substrate, a silicon substrate, or the like.

Step 302: forming a lower electrode on the substrate.

For example, the lower electrode is made of an indium tin oxide (ITO) or indium zinc oxide (IZO) material.

Step 303: forming a photocurrent generating unit on the lower electrode.

Step 304: forming an upper electrode on the photocurrent generating unit.

In at least some of embodiments, the photocurrent generating unit comprises a PN junction, one end of the PN junction is connected with the upper electrode, and the other end of the PN junction is connected with the lower electrode.

The lower electrode and the upper electrode respectively provide a first fingerprint identifying voltage and a second fingerprint identifying voltage for the photocurrent generating unit, and the photocurrent generating unit is configured for generating a photocurrent when being irradiated by the light and the photocurrent effects on the second fingerprint identifying voltage.

In embodiments of the present disclosure, the first fingerprint identifying voltage and the second fingerprint identifying voltage are respectively provided for the photocurrent generating unit by the lower electrode and the upper electrode. When a user's finger touches the module, the light reflected by the user's finger irradiates the PN junction of the photocurrent generating unit, the PN junction generates a photocurrent under the light irradiation and the photocurrent effects on the second fingerprint identifying voltage. Because the intensities of lights respectively reflected by a valley and a ridge of a fingerprint of the finger onto the photocurrent generating unit are different from each other, the photocurrents generated in the photocurrent generating unit are also different from each other, so that amounts of change in voltages on the upper electrode (or the lower electrode) are different, in this way, the valley and the ridge of the fingerprint can be identified. By this means, the module having a fingerprint identifying function is accomplished. In an example, the fingerprint identifying module is applied to the OLED display panel, so the OLED display panel having the fingerprint identifying function is accomplished.

Figure 7:
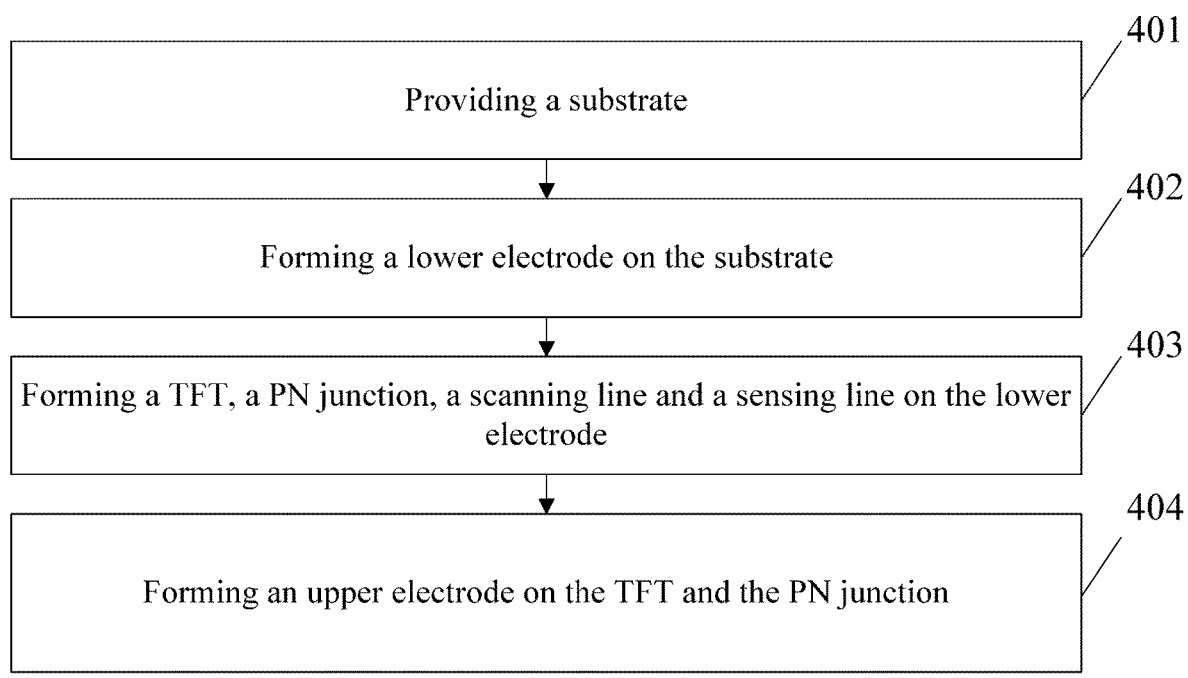
FIG. 7 is a flow chart of another fabrication method of a fingerprint identifying module provided by an embodiment of the present disclosure.

FIG. 7 is a flow chart of a fabrication method of a fingerprint identifying module provided by an embodiment of the present disclosure, for example, the method is used for fabricating the fingerprint identifying module illustrated in FIG. 2a and FIG. 2b. With reference to FIG. 7, the method comprises:

Step 401: providing a substrate.

As described above, the substrate is also referred to as a base substrate, and is made of transparent material, which may be a glass substrate, a plastic substrate, a silicon substrate, or the like.

Step 402: forming a lower electrode on the substrate.

For example, the lower electrode is made of indium tin oxide (ITO) or indium zinc oxide (IZO) material.

Step 403: forming a TFT, a PN junction, a scanning line and a sensing line on the lower electrode.

In embodiments of the present disclosure, the PN junction comprises a P-doped amorphous silicon (a-Si) layer, an undoped a-Si layer and an N-doped a-Si layer sequentially arranged on the lower electrode.

In at least some of embodiments, the TFT comprises a gate electrode, a gate insulating layer, an active layer, as well as a source electrode and a drain electrode arranged sequentially. The gate electrode, the source electrode and the drain electrode of the TFT are, for example, made of metal, such as Al, Cu, Mo, Ti, Cr, or the like. The gate insulating layer is, for example, made of silicon nitride or silicon oxynitride. The active layer includes but is not limited to, an indium gallium zinc oxide (IGZO) active layer, a low temperature polysilicon active layer, or an amorphous silicon active layer.

In at least some of embodiments, both the scanning line and the sensing line are arranged in a same layer as the source electrode of the TFT. The scanning line and the sensing line are arranged in a same layer as the source electrode (or the drain electrode), so as to simplify a fabrication process.

Step 404: forming an upper electrode on both the TFT and the PN junction, the upper electrode being simultaneously connected with the drain electrode of the TFT and one end of the PN junction. The lower electrode is connected with the scanning line. The source electrode of the TFT is connected with the sensing line. The other end of the PN junction is connected with the lower electrode. The TFT is configured for being turned on under an effect of a gate voltage. The scanning line is configured for inputting a first fingerprint identifying voltage to the lower electrode when the TFT is turned on, and the sensing line is configured for inputting a second fingerprint identifying voltage to the source electrode of the TFT.

In at least some of embodiments, the upper electrode is made of metal, such as aluminum (Al), copper (Cu), molybdenum (Mo), titanium (Ti), (chromium) Cr or the like.

In embodiments of the present disclosure, while the TFT is turned on, the source electrode and the drain electrode are turned on. Because the drain electrode is connected with one end of the PN junction through the upper electrode, the potential of one end of the PN junction is the second fingerprint identifying voltage. When the TFT is turned on, the scanning line inputs the first fingerprint identifying voltage to the lower electrode, and because the lower electrode is connected with the other end of the PN junction, the potential of the other end of the PN junction is the first fingerprint identifying voltage. When the user touches the module, light reflected by the user's finger irradiates the PN junction, and the PN junction generates the photocurrent under light irradiation which effects on the second fingerprint identifying voltage. Because intensities of light reflected from the valley and the ridge of the fingerprint of the finger to the PN junction are different from each other, the photocurrents generated in the PN junction are different from each other, so that amounts of change in the second fingerprint identifying voltage on the sensing line are different. In this way, the valley and the ridge of the fingerprint can be identified, and the module having the fingerprint identifying function is accomplished. In an example, the module is applied to the OLED display panel, the OLED display panel having the fingerprint identifying function can be accomplished.

Figure 8:
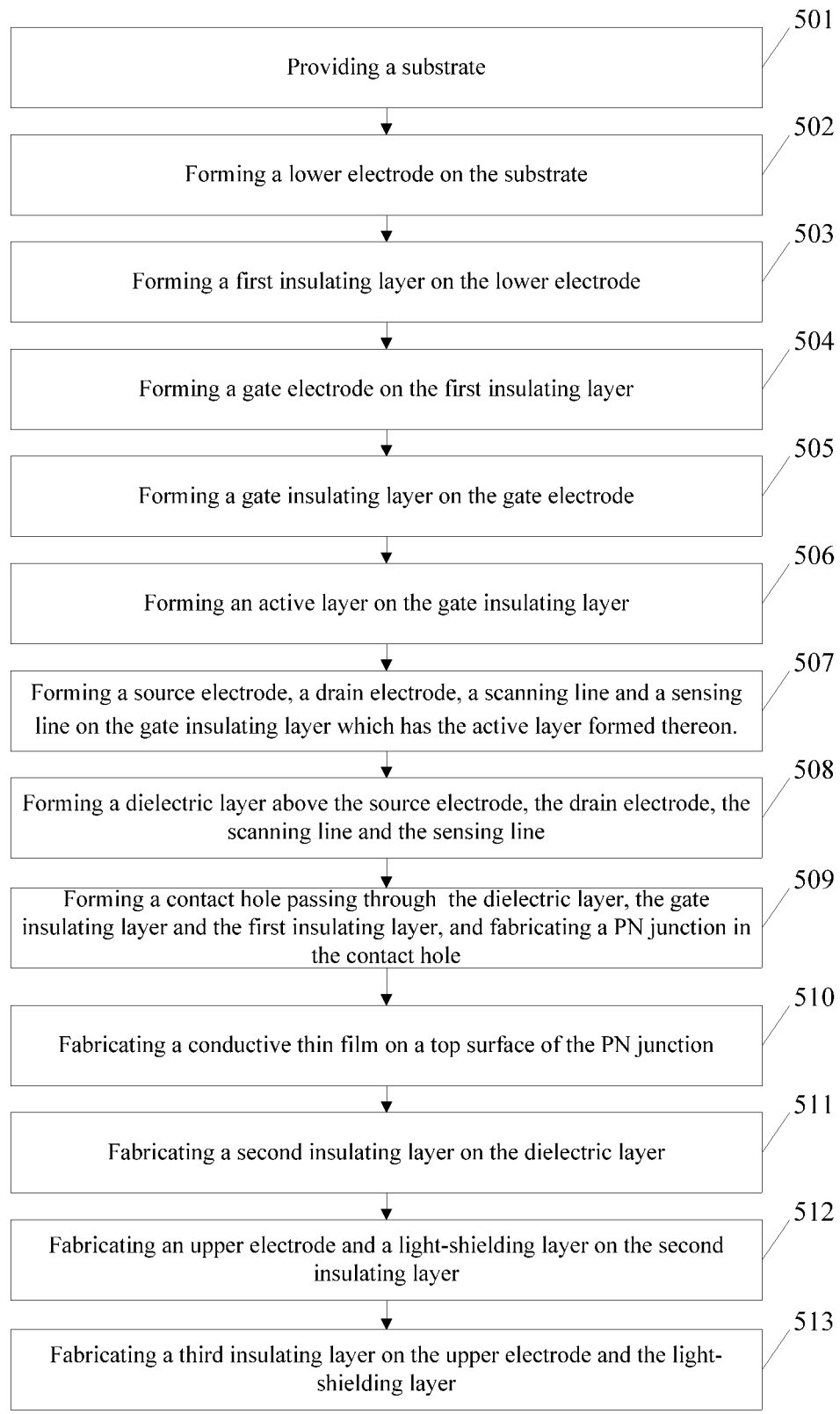
FIG. 8 is a flow chart of still another fabrication method of a fingerprint identifying module provided by an embodiment of the present disclosure.

FIG. 8 is a flow chart of another fabrication method of a fingerprint identifying module provided by an embodiment of the present disclosure, for example, the method is used for fabricating the fingerprint identifying module illustrated in FIG. 4. With reference to FIG. 8, the method comprises:

Step 501: providing a substrate.

As described above, the substrate is also referred to as a base substrate, and is made of transparent material, which may be a glass substrate, a plastic substrate, a silicon substrate, or the like.

Step 502: forming a lower electrode on the substrate.

For example, the lower electrode is made of indium tin oxide (ITO) or indium zinc oxide (IZO) material.

Step 503: forming a first insulating layer on the lower electrode.

Step 504: forming a gate electrode on the first insulating layer.

Step 505: forming a gate insulating layer on the gate electrode.

For example, the gate insulating layer is made of silicon nitride or silicon oxynitride.

Step 506: forming an active layer on the gate insulating layer.

For example, the active layer includes, but is not limited to, an indium gallium zinc oxide (IGZO) active layer, a low temperature polysilicon active layer, or an amorphous silicon active layer.

Step 507: forming a source electrode, a drain electrode, a scanning line and a sensing line on the gate insulating layer which has the active layer formed thereon.

The gate electrode, the source electrode and the drain electrode of the TFT may be made of metal, such as Al, Cu, Mo, Ti, Cr, or the like; and the scanning line and the sensing line may be made of metal, such as Al, Cu, Mo, Ti, Cr, or the like.

The scanning line may be connected with the lower electrode. For example, a contact hole is fabricated in both the first insulating layer and the gate insulating layer, and the scanning line is connected with the lower electrode through the contact hole.

The source electrode of the TFT may be connected with the sensing line.

After the step 507, fabrication of the TFT is completed. The TFT is configured for being turned on under an effect of a gate voltage, the scanning line is configured for inputting a first fingerprint identifying voltage to the lower electrode when the TFT is turned on, and the sensing line is configured for inputting a second fingerprint identifying voltage to the source electrode of the TFT.

Step 508: forming a dielectric layer above the source electrode, the drain electrode, the scanning line and the sensing line.

Step 509: forming a contact hole passing through the dielectric layer, the gate insulating layer and the first insulating layer, and fabricating a PN junction in the contact hole.

The PN junction may comprise a P-doped amorphous silicon (a-Si) layer, an undoped a-Si layer and an N-doped a-Si layer sequentially arranged on the lower electrode.

Step 510: fabricating a conductive thin film on a top surface of the PN junction.

The top surface of the PN junction may be an end surface of one end of the PN junction away from the substrate.

In this embodiment, a bottom surface of the PN junction is connected with the lower electrode.

Step 511: fabricating a second insulating layer on the dielectric layer.

The second insulating layer may be a resin layer.

Step 512: fabricating an upper electrode and a light-shielding layer on the second insulating layer.

The upper electrode may be simultaneously connected with the drain electrode of the TFT and the conductive thin film on the PN junction.

For example, the step 512 comprises: fabricating a first contact hole which passes through the second insulating layer and the dielectric layer and communicates with the drain electrode; fabricating a second contact hole which passes through the second insulating layer and communicates with the conductive thin film; and then fabricating the upper electrode, the upper electrode being connected with the drain electrode of the TFT and the conductive thin film on the PN junction through the first contact hole and the second contact hole respectively.

For example, the step 512 further comprises: fabricating a light-shielding layer directly above the active layer.

Step 513: fabricating a third insulating layer on both the upper electrode and the light-shielding layer.

The dielectric layer, the first insulating layer and the third insulating layer may be silicon nitride or silicon oxynitride layers.

In embodiments of the present disclosure, while the TFT is turned on, the source electrode and the drain electrode are turned on. Because the drain electrode is connected with one end of the PN junction through the upper electrode, the potential of one end of the PN junction is the second fingerprint identifying voltage. When the TFT is turned on, the scanning line inputs the first fingerprint identifying voltage to the lower electrode, and because the lower electrode is connected with the other end of the PN junction, the potential of the other end of the PN junction is the first fingerprint identifying voltage. When the user's finger touches the module, light reflected by the user's finger irradiates the PN junction, and the PN junction generates the photocurrent under light irradiation which effects on the second fingerprint identifying voltage. Because the intensities of light reflected from the valley and the ridge of the fingerprint of the finger to the PN junction are different from each other, the photocurrents generated in the PN junction are different from each other, so that amounts of change in the second fingerprint identifying voltage on the sensing line are different. In this way, the valley and the ridge of the fingerprint can be identified, and the module having the fingerprint identifying function is accomplished. In an example, the module is applied to the OLED display panel, the OLED display panel having the fingerprint identifying function can be accomplished.

Figure 9:
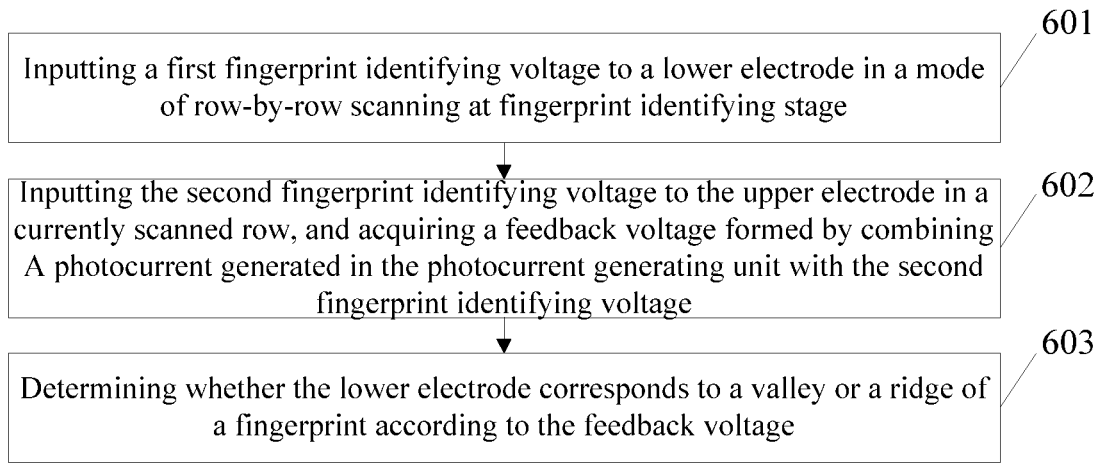
FIG. 9 is a flow chart of a driving method of a fingerprint identifying module provided by an embodiment of the present disclosure.

FIG. 9 is a flow chart of a driving method of a fingerprint identifying module provided by an embodiment of the present disclosure, for example, the method may be applied to the fingerprint identifying module according to any one of the foregoing embodiments, for example, the fingerprint identifying module illustrated in any one of FIG. 1 to FIG. 4. With reference to FIG. 9, the method comprises:

Step 601: inputting a first fingerprint identifying voltage to a lower electrode in a mode of row-by-row scanning at fingerprint identifying stage.

For example, the lower electrode on the fingerprint identifying module is a block electrode. For example, a plurality of block electrodes are distributed in a matrix. When the fingerprint identification is performed, the first fingerprint identifying voltage is input to the lower electrodes in a mode of row-by-row scanning. When the lower electrodes are provided with the first fingerprint identifying voltage, the corresponding TFTs are turned on, so that the plurality of upper electrodes receive the second fingerprint identifying voltage, so as to implement the fingerprint identification in the same row.

Step 602: inputting the second fingerprint identifying voltage to an upper electrode in currently scanned row, and acquiring a feedback voltage formed by combining a photocurrent generated in the photocurrent generating unit with the second fingerprint identifying voltage.

For example, the second fingerprint identifying voltage is provided for the upper electrode through the sensing line. The TFT is provided between the upper electrode and the sensing line, and the TFT is turned on while the first fingerprint identifying voltage are input to the lower electrode. Therefore, only when the lower electrode has the first fingerprint identifying voltage, the second fingerprint identifying voltage is fed to the upper electrode.

Step 603: determining whether the lower electrode corresponds to a valley or a ridge of a fingerprint according to the feedback voltage.

Because the intensities of light reflected from the valley and the ridge of the fingerprint of the finger to the PN junction are different from each other, the photocurrents generated in the PN junction are different from each other, so that amounts of change in the second fingerprint identifying voltage on the sensing line are different. In this way, the valley and the ridge of the fingerprint can be identified according to the feedback voltage.

Thus, in at least some of embodiments, the step 603 comprises: determining that the lower electrode corresponds to the valley of the fingerprint, if the feedback voltage is within a first voltage range; and determining that the lower electrode corresponds to the ridge of the fingerprint, if the feedback voltage is within a second voltage range. The first voltage range and the second voltage range may be obtained in advance by experiments, and the two are not equal to each other.

After the scanning is performed on all fingerprint identifying units, a complete fingerprint can be obtained, in this way, the fingerprint identification can be accomplished according to the obtained fingerprint. For example, the obtained fingerprint is compared with a preset fingerprint, in order to determine whether or not it is a correct user.

In at least some of embodiments, the method further comprises: inputting a touch signal to the lower electrode at touch sensing stage, to implement a touch function by self-capacitance of the lower electrode. At touch sensing stage, the TFT is turned off, so as to prevent the touch signal from being affected by the upper electrode.

In above embodiments, the photocurrent generating unit is disposed between the lower electrode and the upper electrode and is connected with both the lower electrode and the upper electrode. When a user's finger touches the module, the light reflected by the user's finger irradiates the PN junction of the photocurrent generating unit, the PN junction generates a photocurrent under the light irradiation and the photocurrent effects on the second fingerprint identifying voltage. Because the intensities of lights respectively reflected by a valley and a ridge of a fingerprint of the finger onto the photocurrent generating unit are different from each other, the photocurrents generated in the photocurrent generating unit are also different from each other, so that amounts of change in voltages on the upper electrode (or the lower electrode) are different, in this way, the valley and the ridge of the fingerprint can be identified. By this means, the module having a fingerprint identifying function is implemented. In an example, the fingerprint identifying module is applied to the OLED display panel, so the OLED display panel having the fingerprint identifying function is accomplished.

What is described above is related to the illustrative embodiments of the disclosure only and not limitative to the scope of the disclosure; the scopes of the disclosure are defined by the accompanying claims.

The invention claimed is:

1. A fingerprint identifying module, the fingerprint identifying module comprising:
   a substrate;
   a plurality of fingerprint identifying modules on the substrate and arranged as an array, wherein each of the fingerprint identifying modules comprises:
   a lower electrode;
   an upper electrode; and
   a photocurrent generating unit between the upper electrode and the lower electrode and connected with both the upper electrode and the lower electrode, wherein the photocurrent generating unit comprises a PN junction, a scanning line and a sensing line, one end of the PN junction being connected with the upper electrode, and other end of the PN junction being connected with the lower electrode; and
   a thin film transistor (TFT) between the upper electrode and the lower electrode, wherein the upper electrode is connected with a drain electrode of the TFT, the lower electrode is connected with the scanning line; the scanning line is configured for inputting a first fingerprint identifying voltage to the lower electrode while the TFT is turned on; the TFT is configured for being turned on under an effect of a gate voltage; a source electrode of the TFT is connected with the sensing line, and the sensing line is configured for inputting a second fingerprint identifying voltage to the source electrode of the TFT.

2. The fingerprint identifying module according to claim 1, wherein the lower electrode is configured for receiving the first fingerprint identifying voltage at fingerprint identifying stage, and receiving a touch signal at touch sensing stage.

3. The fingerprint identifying module according to claim 1, wherein a light-shielding layer is provided above the TFT.

4. The fingerprint identifying module according to claim 3, wherein the light-shielding layer is provided in a same layer as the upper electrode.

5. The fingerprint identifying module according to claim 1, wherein a conductive thin film is provided on an end surface of one end of the PN junction connected with the upper electrode.

6. The fingerprint identifying module according to claim 1, wherein the lower electrode is made of a transparent conductive material.

7. The fingerprint identifying module according to claim 1, wherein the upper electrode is made of metal.

8. The fingerprint identifying module according to claim 1, wherein the fingerprint identifying module further comprises a dielectric layer, the TFT and the PN junction are isolated from each other by the dielectric layer.

9. The fingerprint identifying module according to claim 1, wherein the scanning line and the sensing line are arranged in a same layer as the source electrode of the TFT.

10. The fingerprint identifying module according to claim 1, wherein the PN junction comprises an N-type region, a P-type region and an intrinsic region; one end of the PN junction is the N-type region, and the other end of the PN junction is the P-type region.

11. A display device, comprising a display panel and the fingerprint identifying module according to claim 1 which is provided on the display panel.

12. The display device according to claim 11, wherein the display panel comprises a plurality of sub-pixel regions; a projection of the upper electrode on the display panel is located between adjacent sub-pixel regions.

13. A method of fabricating a fingerprint identifying module, comprising:
   providing a substrate;
   forming a lower electrode on the substrate;
   forming a photocurrent generating unit on the lower electrode;
   forming an upper electrode on the photocurrent generating unit, the photocurrent generating unit comprising a PN junction, a scanning line and a sensing line, one end of the PN junction being connected with the upper electrode, and the other end of the PN junction being connected with the lower electrode; and forming a thin film transistor (TFT) between the upper electrode and the lower electrode, wherein the upper electrode is connected with a drain electrode of the TFT, the lower electrode is connected with the scanning line; the scanning line is configured for inputting a first fingerprint identifying voltage to the lower electrode while the TFT is turned on; the TFT is configured for being turned on under an effect of a gate voltage; a source electrode of the TFT is connected with the sensing line, and the sensing line is configured for inputting a second fingerprint identifying voltage to the source electrode of the TFT.

14. A method of driving the fingerprint identifying module according to claim 1, the method comprising:

inputting a first fingerprint identifying voltage to the lower electrode in a mode of row-by-row scanning at fingerprint identifying stage;

inputting a second fingerprint identifying voltage to the upper electrode in a currently scanned row, and acquiring a feedback voltage formed by combining a photocurrent generated in the photocurrent generating unit with the second fingerprint identifying voltage; and determining whether the lower electrode corresponds to a valley or a ridge of a fingerprint according to the feedback voltage.

15. The method according to claim 14, further comprising:

inputting a touch signal to the lower electrode at touch sensing stage.

* * * * *